United States Patent [19]
Janin et al.

[11] 3,922,290
[45] Nov. 25, 1975

[54] PROCESS FOR THE PREPARATION OF ANTHRAQUINONE
[75] Inventors: Raymond Janin, Irigny; Leon Krumenacker, Serezin du Rhone, both of France
[73] Assignee: Rhone-Poulenc S.A., Paris, France
[22] Filed: May 8, 1974
[21] Appl. No.: 468,138

[30] Foreign Application Priority Data
May 11, 1973 France ............................ 73.17154

[52] U.S. Cl. ................. 260/385; 252/441; 252/442
[51] Int. Cl.² ..................... C07C 49/68; C09B 1/06
[58] Field of Search ...................................... 260/385

[56] References Cited
UNITED STATES PATENTS
1,787,416 12/1930 Wohl ................................. 260/385
1,787,417 12/1930 Wohl ................................. 260/385
1,880,322 10/1932 Jaeger................................ 260/385
2,643,269 6/1953 Augustine...................... 260/385 X
2,824,881 2/1958 Wettstein........................... 260/385

OTHER PUBLICATIONS
Crocker et al., "J. Chem. Soc.," 1970 (c), 1982–1986.

Primary Examiner—Paul F. Shaver
Attorney, Agent, or Firm—Cushman, Darby & Cushman

[57] ABSTRACT
A simple process for preparing anthraquinone in good yield from anthracene is described, which process comprises oxidising anthracene, in the liquid phase, by means of oxygen or an oxygen-containing gas, in the presence of cupric chloride, and in an organic diluent which is a saturated aliphatic alcohol or a glycol of the general formula:

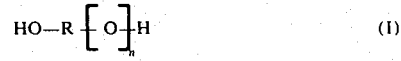

in which R is a linear or branched saturated divalent aliphatic radical containing up to 10 carbon atoms and $n$ is an integer from 1 to 3.

9 Claims, No Drawings

PROCESS FOR THE PREPARATION OF ANTHRAQUINONE

The present invention relates to a process for the preparation of anthraquinone by oxidation of anthracene by means of oxygen or an oxygen-containing gas.

Anthraquinone is a compound of great industrial value, particularly in the manufacture of dyestuffs. Various processes for the preparation of anthraquinone have been proposed, especially from phthalic anhydride (condensation with benzene in the presence of anhydrous aluminum chloride to yield benzoylbenzoid acid which is converted to anthraquinone by means of sulphuric acid). It has also been proposed to oxidise anthracene to anthraquinone in the liquid phase by means of an oxidising agent such as nitric acid or a dichromate, or in the vapour phase by means of oxygen or air in the presence of a catalyst such as vanadium pentoxide. These various processes are not completely satisfactory either because of the reagents employed or because of the reaction conditions; it is clearly important to have available a simple process for the oxidation of anthracene, in the liquid phase, by means of an oxygen-containing gas. During an investigation into the halogenation of aromatic compounds especially phenols and amines, by means of cupric chloride in the presence of oxygen and hydrochloric acid in 1,5-dimethoxy-3-oxapentane (diglyme), H.P. CROCKER and R. WALSER (J. Chem. Soc., 1970, 1982 – 1986) mentioned the formation of anthraquinone from anthracene, but it was found that, under these conditions, the halogenation reaction leads predominantly, to the formation of 9-chloro-anthracene which deprives such a process of any value as an industrial method for the preparation of anthraquinone.

According to the present invention there is provided a process for the preparation of anthraquinone by oxidation of anthracene by means of oxygen or an oxygen-containing gas, in the presence of cupric chloride, and in an organic diluent which is a saturated aliphatic alcohol or a glycol of the general formula:

(I)

in which R is a linear or branched saturated divalent aliphatic radical containing up to 10 carbon atoms and $n$ is an integer from 1 to 3.

More specifically, the aliphatic alcohols which can be used may be linear or branched, primary, secondary or tertiary alcohols containing 1 to 10 carbon atoms, such as methanol, ethanol, propanol, isopropanol, 1-butanol, sec. butanol, tert butanol, 1-pentanol, 1-hexanol or the octanols.

Aliphatic glycols are preferred diluents, such as ethylene glycol, diethylene glycol, triethylene glycol, propane-1,3-diol, propane-1,2-diol, 2-methyl-propane-1,3-diol, 2,2-dimethyl-propane-1,3-diol, butane-1,4-diol, butane-2,3-diol, pentane-1,5-diol and hexane-1,6-diol. The non-condensed glycols, especially ethylene glycol, which makes it possible to obtain excellent yields of anthraquinone, are especially preferred.

The reaction medium can consist of only one such alcohol or glycol or a mixture of two or more of these compounds. The mixture can contain some water.

It has also been found, and this forms a further feature of the present invention, that it is advantageous to carry out the process in the presence of one or more activators which are iron halides, aluminium halides and halides of elements from Groups 3A, 4A and 5A of the Periodic Table as given in "Handbook of Chemistry and Physics", 45th edition, 1964, p. B. 2. The presence of these halides increases the reaction rate. Specific examples include ferrous and ferric chlorides; aluminium chloride; aluminium bromide, boron trifluoride, $SbCl_5$, $SbCl_3$, $SbBr_3$, $SbF_3$, $SbF_5$, $SbI_5$, $AsBr_3$, $AsCl_3$, $AsF_5$, $AsF_3$, $AsI_3$, $AsI_5$, $BiCl_4$ and $BiCl_3$. Amongst these halogenated derivatives, those of antimony are preferred.

Although it is preferable, for reaons of convenience, to employ cupric chloride directly, it is possible to form the latter in situ from cuprous chloride.

The quantity of cupric chloride, expressed as mols of this compound per mol of anthracene, can vary within wide limits. Thus it can be at least $1 \times 10^{-5}$ and can be as much as 2 mols per mol of anthracene, but more than this can be used. In general, it is not necessary to exceed one mole of cupric chloride per mol of anthracene.

The quantity of activator can also vary within wide limits depending on the nature of the compound employed. In general terms, it can be at least $1 \times 10^{-5}$ mol per mol of anthracene and can be as much as 10 mols per mol of anthracene. In the case of particularly active compounds, such as antimony halides, it is generally not necessary to exceed one mol per mole of anthracene.

The temperature at which the reaction is carried out suitably varies from 20° to 200°C. A temperature of from 20° to 180°C is generally very suitable. The oxidation is suitably carried out under a partial pressure of oxygen of 0.1 to 20 bars. When the solvent or the activator, such as boron trifluoride, arsenic trifluoride or arsenic pentafluoride, is gaseous at the temperature chosen, it is preferable to work under a sufficient pressure to keep them in the liquid state in the reaction medium.

In addition to oxygen, it is possible to use mixtures of oxygen with inert gase, such as nitrogen, as the oxidising gas. Typically, air, optionally enriched with oxygen, is used.

The process according to the present invention is particularly simple to effect on a technical scale and can be carried out continuously.

The following Examples further illustrate the present invention.

EXAMPLE 1

120 cm³ of ethylene glycol, 7.12 g of anthracene ($4 \times 10^{-2}$ mole) and 1.02 g of cupric chloride ($6 \times 10^{-3}$ mol) are introduced into a glass flask equipped with a reflux condenser, a thermometer, a dip tube for introducing gas, a stirring system and a thermo-regulated heating device; then the contents of the flask are heated to 140°C with stirring. A stream of oxygen is then introduced into the medium at a rate of 4 l/hour under normal conditions of temperature and pressure. These conditions are maintained for 8 hours, and then the contents of the flask are cooled to 20°C and poured into a sufficient quantity of water to bring the total volume to 1 liter, which brings about the precipitation of the dissolved anthracene. The mixture is left to stand at ambient temperature for 12 hours and is then filtered through sintered glass. The precipitate obtained is dried to constant weight over $P_2O_5$. In this way, 7.98 g of a product are isolated, in which 4 g of anthracene and 3.65 g of anthraquinone, which corresponds to degree of conversion of anthracene of 44% and to a yield of anthraquinone relative to the converted anthracene of 99%, are measured by chromatography on alumina.

EXAMPLE 2

The procedure of Example 1 is followed, but in the presence of $12.5 \times 10^{-3}$ mole of $SbCl_5$. Under these conditions, 7.90 g of a precipitate are recovered, in which 3.04 g of unconverted anthracene (degree of conversion 57.5%) and 4.62 g of anthraquinone (yield relative to the converted anthracene: 96.5%) are measured.

We claim:

1. In a process for the preparation of anthraquinone which comprises oxidising anthracene, in the liquid phase, by means of oxygen or an oxygen-containing gas, in the presence of cupric chloride, and in an organic diluent, the improvement wherein the organic diluent is a glycol of the general formula:

  (I)

in which R is a linear or branched saturated divalent aliphatic radical containing up to 10 carbon toms and $n$ is an integer from 1 to 3.

2. Process according to claim 1, which is carried out in the presence of an activator which is an iron halide, aluminium halide, boron trifluoride, an antimony halide, an arsenic halide and a bismuth halide.

3. Process according to claim 2, in which the activator is antimony pentachloride.

4. Process according to claim 1, in which the diluent is ethylene glycol.

5. Process according to claim 1, which is carried out at a temperature of from 20° to 200°C. under a partial pressure of oxygen of from 0.1 to 20 bars.

6. Process according to claim 1, in which the cupric chloride is present in an amouont of at least $1 \times 10^{-5}$ mol per mol of anthracene.

7. Process according to claim 2, in which the activator is present in an amount of at least $1 \times 10^{-5}$ mol per mol of anthracene.

8. Process according to claim 1 which comprises oxidising anthracene in ethylene glycol in the presence of cupric chloride and antimony pentachloride.

9. Process according to claim 1 in which $n$ is 1.

* * * * *